United States Patent [19]
Roush

[11] Patent Number: 5,457,786
[45] Date of Patent: Oct. 10, 1995

[54] SERIAL DATA INTERFACE WITH CIRCULAR BUFFER

[75] Inventor: Paul E. Roush, Austin, Tex.

[73] Assignee: Texas Instruments Incorporated, Dallas, Tex.

[21] Appl. No.: 175,835

[22] Filed: Dec. 30, 1993

Related U.S. Application Data

[63] Continuation of Ser. No. 547,746, Jul. 3, 1990, abandoned.

[51] Int. Cl.$^6$ ............................................. G06F 15/16
[52] U.S. Cl. .................... 395/280; 395/250; 364/DIG. 1; 364/229.2; 364/232; 364/231.9
[58] Field of Search ..................................... 395/275, 200, 395/250, 500, 650, 325, 425, 800; 341/101

[56] References Cited

U.S. PATENT DOCUMENTS

| | | | |
|---|---|---|---|
| 4,535,404 | 8/1985 | Shenk | 395/275 |
| 4,583,195 | 4/1986 | Daniels et al. | 395/500 |
| 4,625,307 | 11/1986 | Tulpule et al. | 370/85 |
| 4,641,263 | 2/1987 | Perlman et al. | 395/500 |
| 4,728,930 | 3/1988 | Grote et al. | 340/347 |
| 4,739,323 | 4/1988 | Miesterfeld et al. | 340/825.5 |
| 4,809,217 | 2/1989 | Floro et al. | 395/275 |
| 4,833,600 | 5/1989 | Brodsky | 364/200 |
| 4,933,846 | 6/1990 | Humphrey et al. | 395/325 |
| 5,005,151 | 4/1991 | Kurkowski | 395/425 |
| 5,025,257 | 6/1991 | Hartley et al. | 341/101 |
| 5,113,516 | 5/1992 | Johnson | 395/500 |
| 5,121,390 | 6/1992 | Farrell et al. | 395/200 |
| 5,123,089 | 6/1992 | Beilinski et al. | 395/200 |
| 5,142,677 | 8/1992 | Ehlig et al. | 395/650 |
| 5,148,547 | 9/1992 | Kahle et al. | 395/800 |

Primary Examiner—Allen R. MacDonald
Assistant Examiner—Tariq Hafiz
Attorney, Agent, or Firm—Ruben C. DeLeon; James C. Kesterson; Richard L. Donaldson

[57] ABSTRACT

An interface for receiving and transmitting serial data from and to a communications bus and for permitting access to the data by a processor, after the data has been converted to parallel form. The interface makes use of two random access memories. A read memory stores incoming data from the communications bus and is read by the processor. A write memory, to which the processor may write, stores outgoing data to place on the communications bus. These memories are controlled by programmable logic devices, programmed so that the processor is interrupted at a selected time interval for service to the memories. Special features include a dual access mode, in which the processor may operate on incoming data in place.

19 Claims, 9 Drawing Sheets

| State | Bit 2 | Bit 1 | Bit 0 | |
|---|---|---|---|---|
| 0 | 1 | 1 | 0 | normal; processor ready |
| 1 | 1 | 1 | 1 | S-to-P start; processor ready; processor completes cycle |
| 2 | 1 | 0 | 0 | bus switch; switch to S-to-P address |
| 3 | 0 | 0 | 0 | S-to-P memory access |
| 4 | 0 | 0 | 0 | bus switch |
| 5 | 0 | 1 | 0 | processor ready; wait for S-to-P |
| 0 | 1 | 1 | 1 | return to normal |
| 6 | 1 | 0 | 1 | dummy state for S-to-P access during reset |
| 7 | 0 | 0 | 1 | not used |

SERIAL DATA INTERFACE WITH CIRCULAR BUFFER

This application is a Continuation of application Ser. No. 07/547,746, filed Jul. 3, 1990, now abandoned.

TECHNICAL FIELD OF THE INVENTION

This invention relates to data communications systems, and more particularly to an interface for incoming and outgoing streams of serial data to a data processor.

BACKGROUND OF THE INVENTION

Data communications between computers or between computers and peripherals over long distances is typically serial rather than parallel. In other words, the data move bit by bit over a single transmission line, rather than simultaneously in groups.

Large volume, high speed data transmission is typically synchronous and in the form of a continuous bit stream. Data transfer is controlled by a timing signal, and special synchronization characters are placed within blocks of data to monitor the bit transitions.

At the processing end of the communications system, a computer receives input from multiple sources. The computer does not process these inputs directly; some sort of interface is needed to organize, store, and convert the data to a parallel form.

A typical feature of existing interfaces for serial communications data is the use of a processor interrupt once for each data sample received. This results in processing overhead, which can substantially slow the operation of the system.

Speed of processor access to incoming data is especially important for signal processing applications of serial data transmissions. For example, voice recognition systems are capable of receiving voice data and identifying the source of the voice. These signal processing applications are characterized by the use of algorithms that operate iteratively on a data item. For such systems, some sort of access device is needed at the receiving end of the data transmission system to facilitate the processor's ability to easily and quickly operate on the data. Ideally, the access device should permit processing operations to be performed in as close to real time as possible.

SUMMARY OF THE INVENTION

A first aspect of the invention is an interface for receiving and transmitting serial data from and to a communications bus and for permitting access to the data by a processor, after the data has been converted to parallel form. The interface makes use of two random access memories. A read memory stores incoming data from the communications bus and is read by the processor. A write memory, to which the processor may write, stores outgoing data to place on the communications bus. These memories are controlled by programmable logic devices, programmed so that the processor is interrupted at a selected time interval for service to the memories. The memories have duplicate addresses, received from either the processor side of the interface or from the communications bus side of the interface. Multiplexers select the addresses, depending on the accessing device and the memory to be accessed.

A technical advantage of the interface is that it facilitates real time processing of a serial data stream. Programmable interrupts permit the interface to accumulate data before requiring service from the processor. The interface's read and write memories permit the processor to access and operate on data within the interface, eliminating any need to move the data to temporary storage. The interface provides an "elastic" data path, in the sense that the processor may read the data in the interface, operate on it and return it, or operate on it in place, before the interface writes new incoming data.

DETAILED DESCRIPTION OF THE INVENTION

Copyright Notice

A portion of the disclosure of this patent document contains material that is subject to copyright protection. The copyright owner has no objection to the facsimile reproduction by anyone of the patent disclosure, as it appears in the Patent and Trademark Office files or records, but otherwise reserves all copyright rights whatsoever.

General Description and Preferred Embodiment

Figure 1:
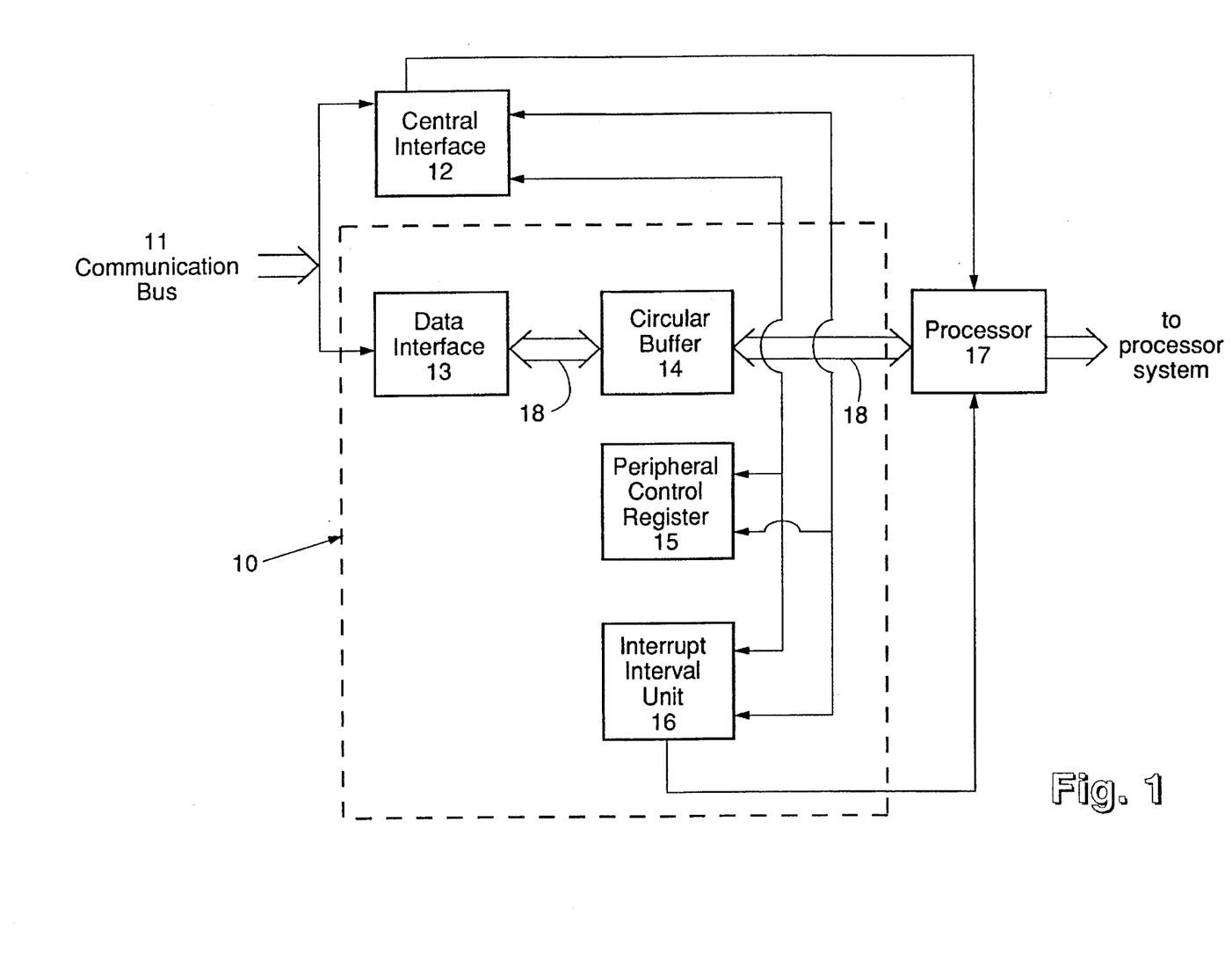
FIG. 1 is a block diagram of the main components of a serial data interface in accordance with the invention.

FIG. 1 is a block diagram of an interface 10 for a data communications system. Incoming data are received by interface 10 via a communications bus 11. Interface 10 provides a processor 17 with access to the data. Outgoing data from processor 17 is handled by interface 10 for placement on communications bus 11.

For purposes of this description, the application of interface 10 is in a telecommunications system at a switch site, to which multiple sources send data. The serial data received by interface 10 is digitized voice data, sampled as 8-bit words. Two-way communication is assumed, and the data is asynchronous. Even though these specific characteristics of this voice recognition application are included herein, the invention is useful with any type of serial data, and may be used for one-way communications, such as when data is only received by interface 10, or for synchronous data.

The incoming and outgoing data may be single channel or multiple channel. As will be explained below, certain features of the invention are useful when the data is in multiple channels. The number of channels may vary, however, the complexity of processing algorithms that operate on the incoming data may increase with the number of channels. For purposes of example, this description is in terms of 32 channels. When multiple channels are used, switches (not shown) are used to make connections from communications bus 11 to interface 10. A control interface 12 is used for switching control, and in the preferred embodiment is a bi-directional serial-to-parallel converter.

Incoming data is in frames of 256 8-bit samples per channel. A frame from each channel is stored before any data is destroyed.

Consistent with the signal processing application, communications bus 11 contains serial lines, and clocking and synchronization signals.

Interface 10 is comprised of several main components: a data interface 13, a circular buffer 14, a peripheral control register 15, and an interrupt interval register 16, and an internal bus 18. In a most basic sense, a function of interface 10 is to relieve processor 17 of the task of exchanging data on each data frame. Instead, data is buffered so that processor 17 can access it in larger blocks and thus more efficiently. However, interface 10 has other significant features, as are explained below.

A processor 17 reads the data from interface 10 and operates on the data in some manner. As explained below, a feature of the invention is that, at the same time as incoming data is read into circular buffer 14, outgoing data is read from circular buffer 14. Internal bus 18 provides bidirectional communications between data interface 12 and circular buffer 14 and between circular buffer 14 and processor 17.

A particular advantage of the invention is that it permits an item of data to be operated on by processor 17 within interface 10, without the need for temporary storage. Thus, the invention is especially useful for iterative signal processing algorithms, and processor 17 may be a special purpose signal processor. As used herein, data from the same "time slice" is data from a particular sampling period, including the data's original value, as well as any values it may acquire as a result of processing by processor 17.

In the embodiment of this description, processor 17 is a 32-bit processor, and operates on a 32-bit word comprised of an 8-bit pointer, and 8-bit write data field, and an 8-bit read data field. In other embodiments, these fields could be other sizes and need not be combined as a single word.

FIGS. 2–5 illustrate the various components of interface 10 in further detail. FIGS. 2–5 include references to device part numbers, which are understandable by those skilled in digital circuits. These part numbers are illustrative only, and other parts having similar functions could be substituted.

As indicated by FIGS. 2–5, a feature of interface 10 is the use of various programmable array logic (PAL) devices. In the embodiment of this description, a total of 8 PAL's are used to implement various logic functions. These PAL's include one for providing an address pointer, three for control functions, two for address multiplexing, and 2 for I/O address decoding and control. Further details about the function of each are set out below. Other programmed logic devices could be used instead of PAL's, and the devices could be mask programmed as well as field programmed. Also, an equivalent interface 10 could be implemented with integrated circuits.

Program listings for the various PAL's accompany this description as Appendices A–H, and are written in the Universal Compiler for Programmable Logic (CUPL) language, whose name is a trademark of Personal CAD Systems, Inc. The particular processor 17 used in the implementation illustrated by this programming is the TMS320C30, a signal processor manufactured by Texas Instruments, Incorporated. This processor is referred to in the listings as the "C30". It has two separate strobe signals, one for input/output (I/O) and one for memory access.

Figure 2A:
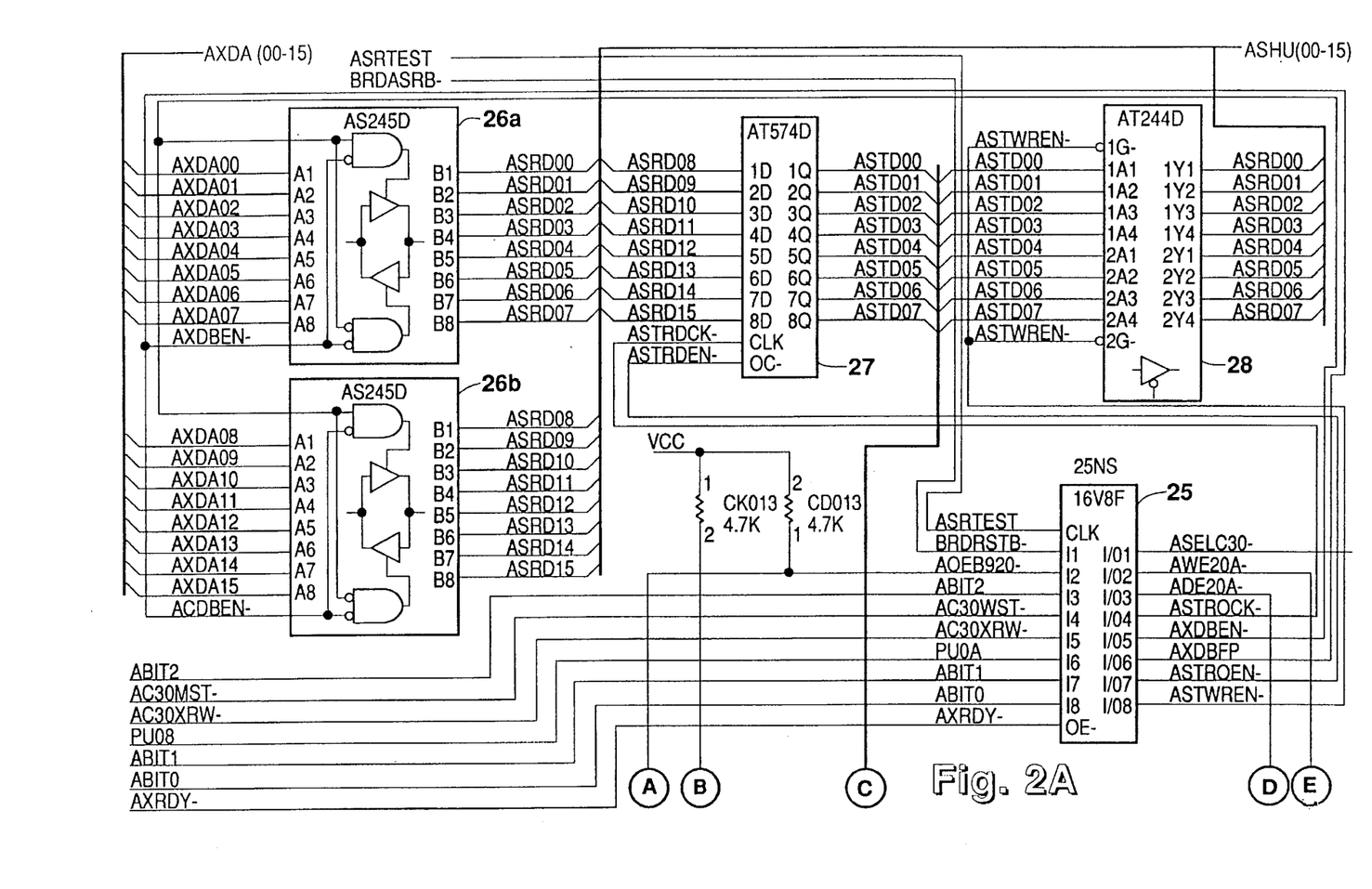
FIG. 2 is a schematic diagram of the data interface of FIG. 1.
Figure 2B:
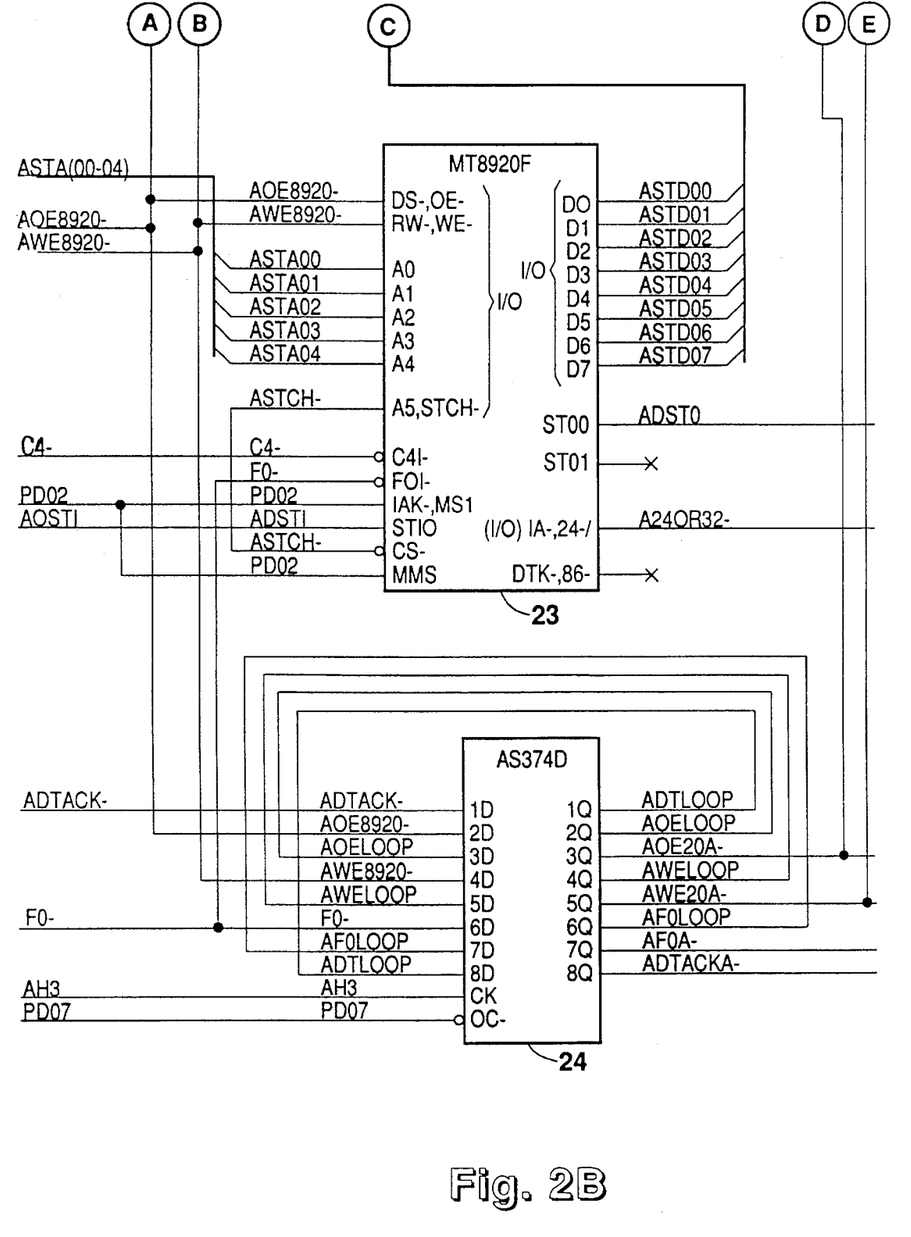

FIG. 2 illustrates data interface 13 in further detail. As shown, data interface 13 includes serial-to-parallel converter 23 and a first control PAL 25. Synchronizer 24 is used to synchronize signals on communications bus 11 to signals that are local to processor 17. Various buffers 26a, 26b, and 28, and a latch 27 are used to direct data among data interface 13, circular buffer 14, and processor 17.

Serial-to-parallel converter 23 receives incoming serial and converts it to data words, which in this embodiment are 8 bits in size. The 8 bits of data are delivered to circular buffer 14 via buffer 28.

In the preferred embodiment, serial-to-parallel converter 23 is bidirectional, and receives outgoing data from circular buffer 14 as well as incoming data from communications bus 11. Serial-to-parallel converter 23 provides the low 5 bits of a 13-bit address used to address circular buffer 14. As indicated in FIG. 2, an example of a suitable device is the MT8920 parallel access circuit.

A control PAL 25 generates control signals for buffers 26a, 26b, and 28. Illustrative programming for control PAL 25 is set out in Appendix A, where control PAL 25 is an unclocked GAL16V8 or a compiled PAL1618 device having a speed of 25 nanoseconds (ns). Control PAL 25 is a companion to two other control PAL's 36 and 37, which are explained below in connection with FIG. 3.

Figure 3A:
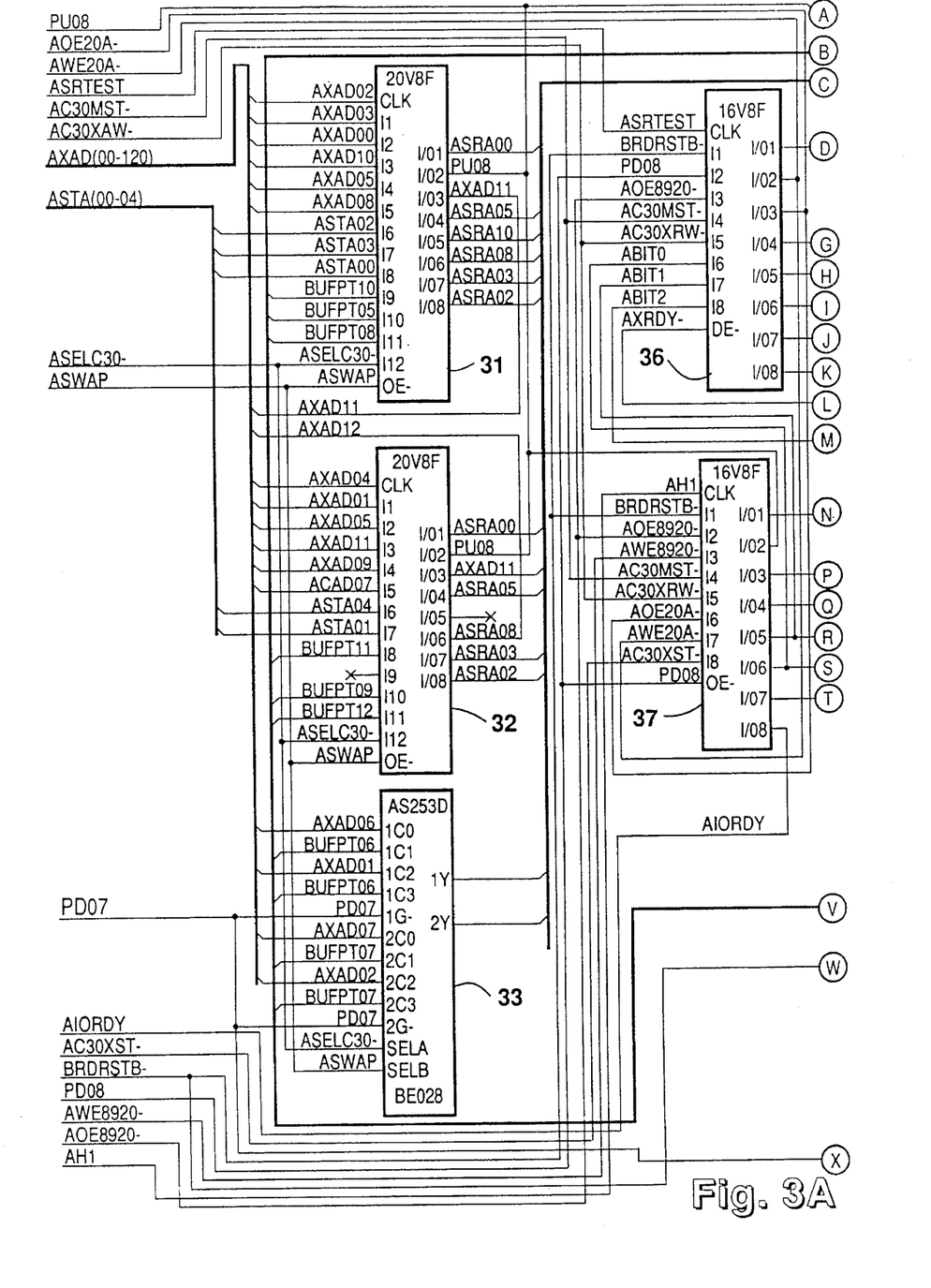
FIG. 3 is a schematic diagram of the circular buffer of FIG. 1.
Figure 3B:
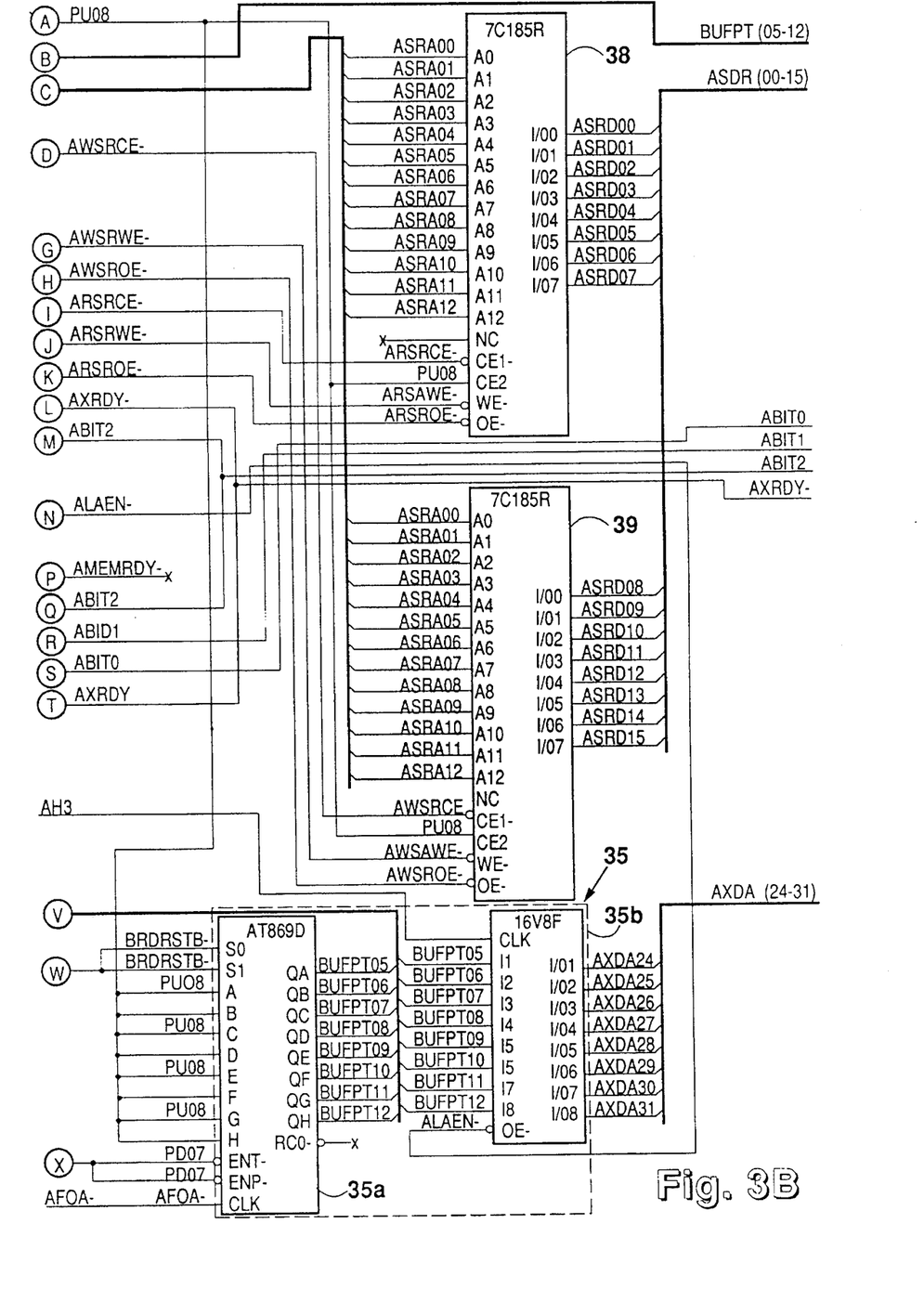

FIG. 3 illustrates circular buffer 14 in further detail. The data storage functions of circular buffer 14 are implemented with two memory units, read memory 38 and write memory 39, which are used to place data off and on communications bus 11. Incoming 8-bit parallel data from serial-to-parallel converter 23 is placed in read memory 38, from which processor 17 reads. Processor 17 writes outgoing data to write memory 39. By using write memory 39 for writing data, circular buffer 14 may receive data from processor 17 without the destruction of incoming data.

At the same time that processor 17 accesses an item of data in read memory 38, it may access data in write memory 39. This feature permits data to be operated on from within circular buffer 14, rather than in a separate memory area. In a normal mode, on each write cycle, processor 17 writes only to write memory 39 so as to not change values of incoming data from communications bus 11. However, in a special dual write mode, processor 17 may also write to read memory 38. This permits processor 17 to perform successive operations on a data item from a particular time slice, such as is required for iterative algorithms.

Memories 38 and 39 are implemented with static random access memory (SRAM) devices. In the embodiment of this description, the SRAM size of memories 38 and 39 is 8K by 8 bits. This accommodates a maximum frame size of 256 8-bit samples and 32 channels. However, in actual operation, a frame size of less than 256 samples is preferred, so that processor 17 has time to operate on a frame while the first portion of the next frame is being stored.

Processor 17 may access any location of memory units 38 and 39 at any time, except data that is currently being written. If an access contention occurs between communications bus 11 and processor 17, the access of processor 17 is lengthened by a predetermined number of cycles so that the communications bus 11 access is accommodated. This control process is explained below in connection with FIG. 3 and control PAL 37.

Circular buffer 14 also includes a pointer generating means 35, implemented with counter 35a and subtract PAL 35b. These devices provide an 8-bit head pointer that points to the last sample of incoming data. Subtract PAL 35b subtracts the value 1 from a value determined by counter 35a so that the last updated position rather than the current position is indicated. The pointer value is the last sample number, which may be correlated to an address in that it corresponds to the 8 most significant bits of the address to memories 38 and 39. Illustrative programming for subtract PAL 35b is set out in Appendix B, where subtract PAL 25 is a GAL16V8 or a compiled PAL16R8 running at 25 ns.

When the pointer value overflows counter 35a, counter 35a restarts counting at 0. In the embodiment described herein, each memory 38 and 39 contains 256 samples of data for each of 32 channels, where each sample is approximately 125 microseconds in length. Thus, processor 17 has approximately 32 milliseconds to read the data in read memory 38 or to write data to write memory 39.

As stated above, processor 17 operates on a 32-bit word that contains the head pointer, write data, and read data. On each read cycle of processor 17, it reads the read data from read memory 38, reads the write data from write memory 39, and reads the head pointer from subtract PAL 35b. Processor writes, which are explained above, do not write to the pointer value.

Every access of processor 17 to circular buffer 14 provides processor 17 with an absolute address reference for the head pointer at the exact access time. This is because, as explained above, the pointer values and read data are read at the same time. Processor 17 maintains its own tail pointer.

Circular buffer 14 also includes a first multiplexer PAL 31, a second multiplexer PAL 32, and an SRAM address multiplexer 33. Multiplexers 31, 32, and 33 multiplex addresses from either from processor 17, which provides a 13-bit address, or from serial-to-parallel converter 23 and counter 35a, which provide 5 bits and 8 bits of a 13-bit address, respectively, for their respective accesses. In light of their address generating function, the serial-to-parallel converter 23 and counter 35a are referred to herein as an "address generating means".

The PAL multiplexers 31 and 32 multiplex the higher and lower 5 bits. One PAL works on 6 outputs, and the other works on 4. Multiplexer 33 multiplexes the 3 remaining bits. An example of a suitable device is a 74AS257 device.

Control signals control the source of the address to the multiplexers, and permit a memory reorganization feature of the invention, which permits more versatile processing algorithms by allowing memories 38 and 39 of circular buffer 14 to be organized in either of two modes.

Figure 4:
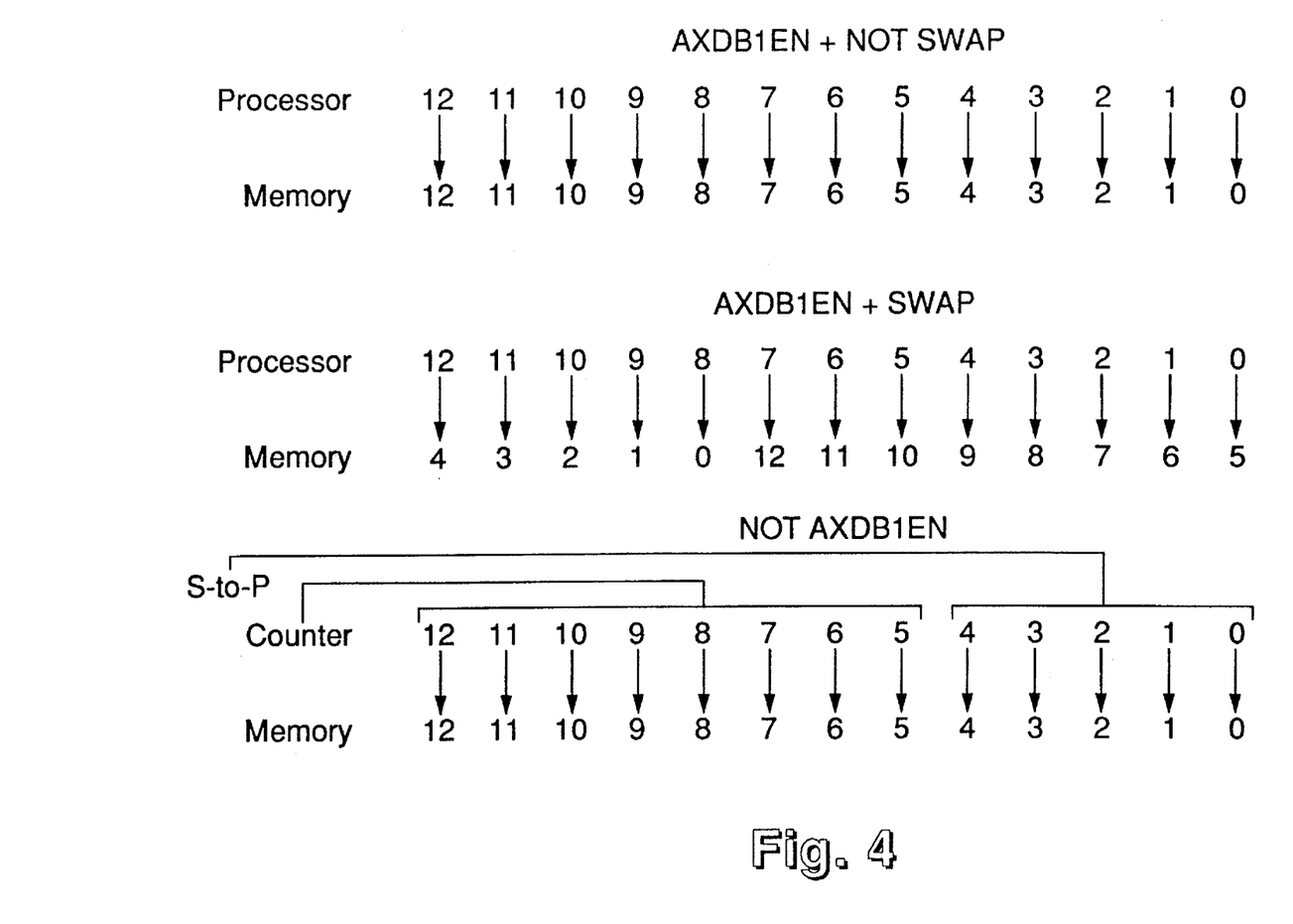
FIG. 4 illustrates a memory reorganization process implemented by the multiplexers of FIG. 3.

Illustrative programming for multiplexer PAL's 31 and 32 is set out in Appendices C and D, where these devices are GAL20V8LCC PAL's operating at 25 ns. The control signals are AXDB1EN and SWAP. FIG. 4 illustrates how multiplexers 31, 32, and 33 are used to arrange the address bits.

Referring to Appendices C and D and FIG. 4, the AXDB1EN (Appendices C and D), or AXDBEN (FIG. 4), signal controls the address source. When AXDB1EN, the address is sourced from processor 17. Otherwise, counter 35a of circular buffer 14 provides the 8 most significant bits and serial-to-parallel register 23 provides the 5 least significant bits.

The SWAP signal controls the memory organization of circular buffer 14 from the perspective of processor 17. When SWAP, circular buffer 14 appears to processor 17 as 256 sets of 32 channels of data. In the other mode, circular buffer 14 appears as 32 sets of 256 samples of data. This is accomplished by placing the 5 least significant bits in the most significant bit positions, and shifting the most significant bits to the right, as shown in FIG. 4.

A second control PAL 36 and third control PAL 37 operate in conjunction with first control PAL 25 to provide control signals to memories 38 and 39. More or fewer PAL's could be used, depending on the available number of inputs and outputs. Control PAL 36 is an unclocked device, whose inputs are the memory control signals from processor 17, control signals from serial-to-parallel converter 23, and the output of control PAL 37. Control PAL 36 generates chip enable, write enable, and output enable signals to memories 38 and 39. Illustrative programming for control PAL 36 is set out in Appendix E, where control PAL 36 is a GAL16V8 or compiled PAL16L8 device operating at 25 ns.

Third control PAL 37 is a clocked device that handles a sequence of states. It manages memory contention by sequencing accesses. Illustrative programming for control PAL 37 is set out in Appendix F, where control PAL 37 is a GAL16V8 or compiled PAL16R4 device operating at 15 ns. Bits 0–2 form a state machine whose outputs are decoded to change the driving of the internal bus 18.

Figure 5:
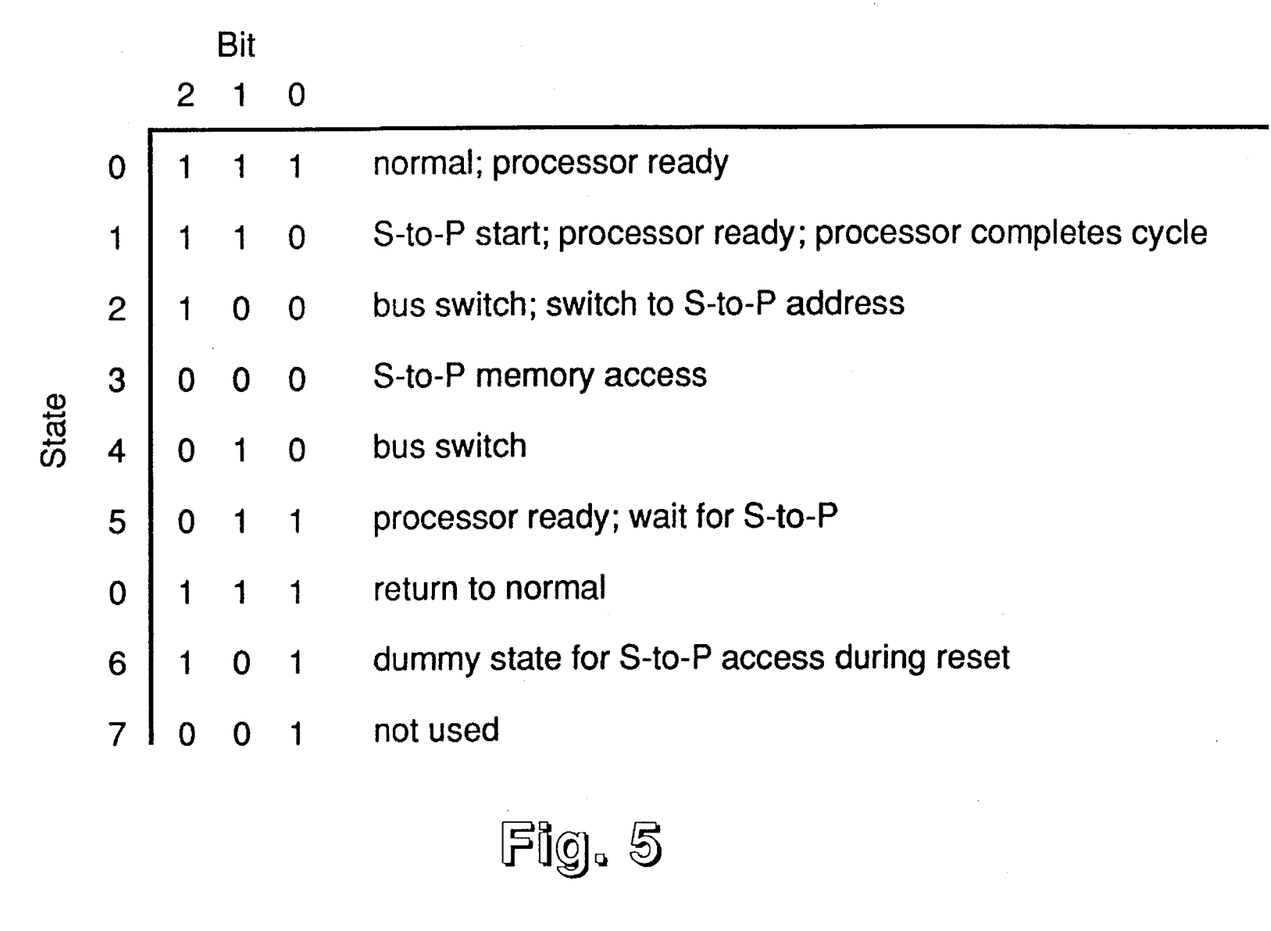
FIG. 5 illustrates the states sequenced by one of the control PAL's of FIG. 3.

FIG. 5 illustrates the states that are sequenced by control PAL 37. For all memory access by serial-to-parallel converter 23, multiplexers 31, 32, and 32 will switch to the serial-to-parallel converter 23 addresses during states S2 and S3. Processor 17 is not ready in states S1–S4. The bus referred to in FIG. 5 is internal bus 18.

For serial-to-parallel converter 23 write operations, control PAL 37 waits for the current processor cycle to complete (S1), switches the buses (S2), and writes the data (S3). After another bus switch state (S4), processor 17 goes to ready and control PAL 37 waits (S5) until the serial-to-parallel converter 23 access is completed.

For serial-to-parallel converter 23 read operations, control PAL 37 waits for the current processor 17 cycle to complete (S1), switches the bus (S2), and the data from write memory 39 is enabled and latched (S3) with latch 27. After another bus switch state (S4), processor 17 goes to ready and control PAL 37 waits (S5) until the serial-to-parallel converter 23 read is completed. Latch 27 remains enabled until the read is finished.

Figure 6A:
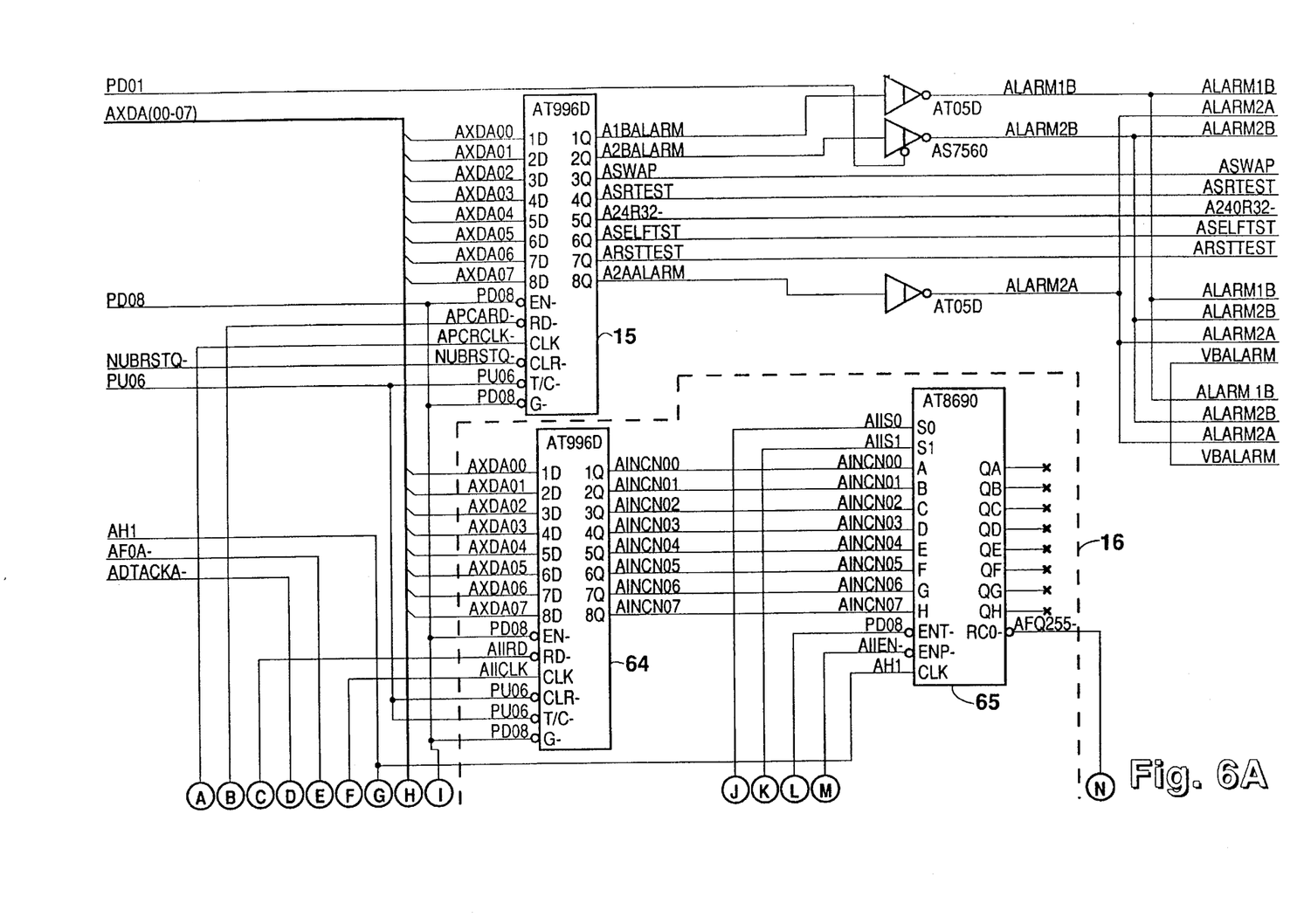
FIG. 6 is a schematic diagram of the peripheral control register and the interrupt interval unit of FIG. 1.
Figure 6B:
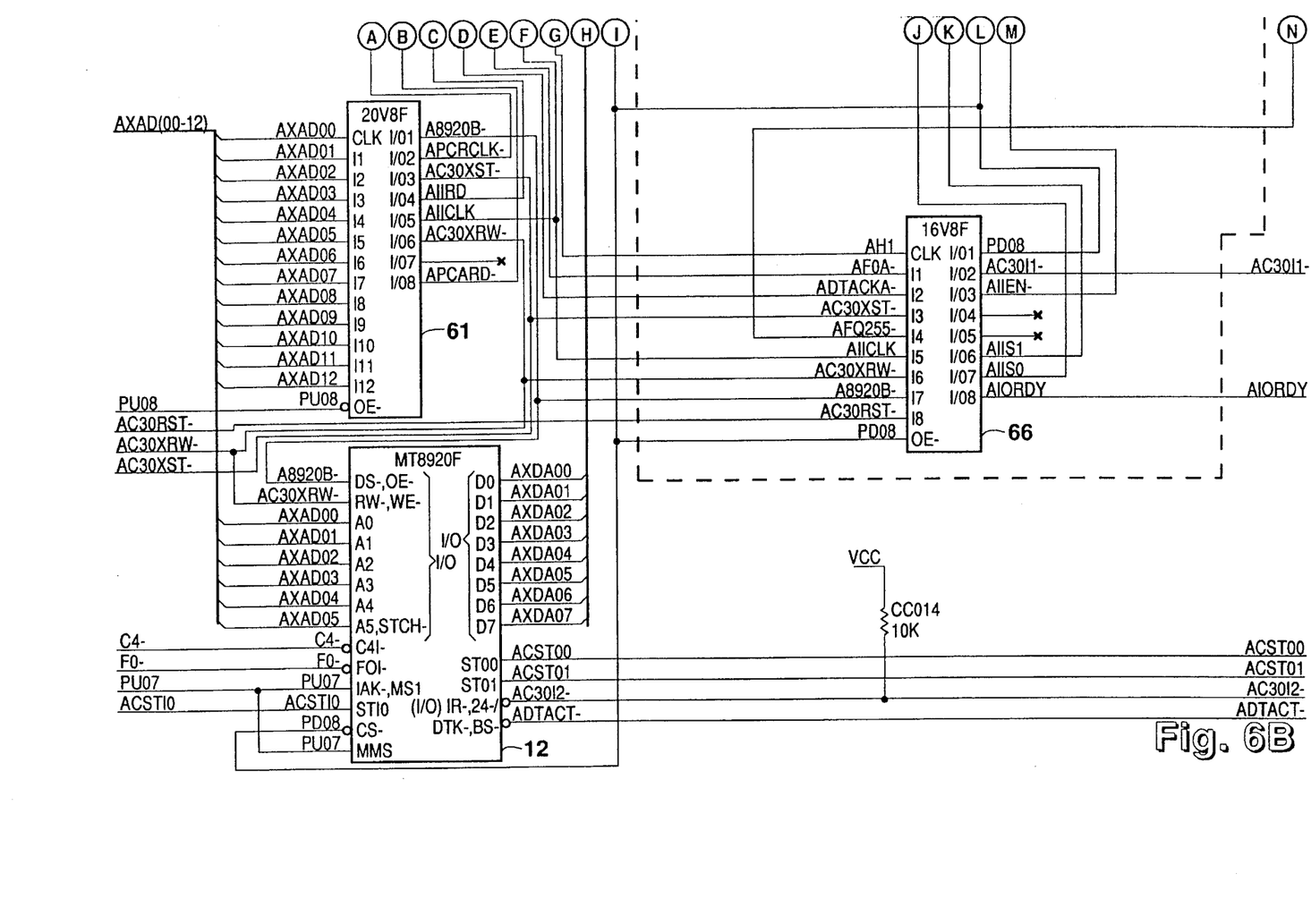

FIG. 6 illustrates peripheral control register 15 and interrupt interval unit 16 in further detail. I/O address decoder PAL 61 decodes access to the peripheral control register 15 or to interrupt interval unit 16. Illustrative programming for I/O address decoder PAL 61 is set out in Appendix G, using a PAL20L8 device operating at 15 ns.

Peripheral control register 15 controls two functions related to the invention, specifically, the address mode of circular buffer 14 and access by processor 17 to read memory 38. Other functions may be controlled by peripheral control register 15, but are not included in this description. An address mode control bit sets the "swap" feature of circular buffer 14, explained above in connection with FIG. 3. A memory control bit permits processor 17 to write to read memory 38 of circular buffer 14, and thus implements the in-place data manipulation feature of the invention.

Interrupt interval unit 16 controls the frequency with which circular buffer 14 interrupts processor 17 for service. A register 64 stores a frequency value, which is any number equal to or less than the maximum number of samples per frame. In the embodiment of this description, where the size of the circular buffer is 256, the frequency value may be in the range of 1 to 256. For example, if interrupt interval register is set to 50, circular buffer 14 will interrupt processor 17 once for every 50 data samples. An interrupt counter 65 determines when an interrupt will occur.

The "circular" feature of circular buffer 14 comes from the fact that the interrupts occur every nth sample, regardless of the sample's absolute address in memory. For example, if n=200, the first interrupt occurs at the 200th sample, the next interrupt at the 144th sample, etc. This eliminates the need for an applications programmer to use the absolute address of the data to be accessed. The programmer need only know the frequency of the interrupts and the value of the head pointer.

Interrupt interval unit 16 also includes an I/O control PAL 66, a clocked device that sequences events during access to interface 10. I/O control PAL 66 creates the interrupt signal that calls processor 17 into service. An illustrative program listing for I/O control PAL 66 is set out in Appendix H, using a GAL16V8 or compiled PAL16R6 device operating at 15 ns. The 8920 device referred to in Appendix A is the control interface 12 of FIG. 1.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An interface for receiving and transmitting serial data from and to a communications bus and for permitting access to the data by a processor, comprising:
   a read buffer for receiving said data from said communications bus, wherein said read buffer is connected to said processor, and allows said processor to write in said read buffer;
   a write buffer for storing outgoing data to be placed on said communications bus, wherein said write buffer is connected to said processor;
   an address generating means for generating an address to said read buffer or said write buffer for use in accessing said write buffer and said read buffer from said communications bus;
   at least one programmable logic device for controlling said write buffer and said read buffer, and said at least one programmable logic device is programmed to interrupt said processor at a selected time interval to service said read buffer and said write buffer; and
   multiplexers for selecting an address to said read buffer and said write buffer whereby said address is generated by said processor or generated by said address generating means.

2. The interface of claim 1, wherein said read buffer and said write buffer are random access memories.

3. The interface of claim 1, wherein said address generating means is a bidirectional serial-to-parallel converter and a counter that counts incoming data samples.

4. The interface of claim 1, wherein said programmable logic device is programmed so that said processor may be directed to write to said read buffer.

5. The interface of claim 1, including an interrupt interval register for determining said selected time interval.

6. The interface of claim 1, wherein said multiplexers are PAL's programmed to reorganize memory address bit positions, such that said memory is reorganized from m number of samples and n number of channels to n samples and m channels.

7. The interface of claim 6, including a plurality of control signals to activate said address reorganization.

8. The interface of claim 1, including a pointer generating means for creating a pointer to data in at least one of said memories, wherein said pointer is part of said address used for receiving data from the communications bus.

9. The interface of claim 8, wherein said programmable logic device is further programmed so that data from said read buffer and said pointer are available to said processor at the same time.

10. The interface of claim 8, wherein said pointer generating means includes a counter for counting incoming data words and a programmable logic device.

11. A system for communicating serial data between a communications bus and a processor, comprising:
    a data interface for converting said data from serial to parallel form and for generating part of an address used for receiving data from said communications bus;
    a circular buffer having a read buffer connected to said processor for receiving said data from said communications bus, and a write buffer connected to said processor;
    an address generating means for generating an address to said read buffer or said write buffer for access to said read buffer and said write buffer from said communications bus, at least one programmable logic device for controlling said write buffer and said read buffer and said at least one programmable logic device is programmed so that said processor is interrupted at a selected time interval to service said read buffer and said write buffer;
    a plurality of multiplexers for selecting an address to said read buffer and said write buffer, wherein said address is generated by said processor or generated by said data interface and said pointer generating means; and
    a control interface for handling switching of data from said communications bus.

12. The interface of claim 11, wherein said read buffer and said write buffer are random access memories.

13. The interface of claim 11, wherein said address generating means is a bidirectional serial-to-parallel converter and a counter that counts incoming data samples.

14. The interface of claim 11, wherein said programmable logic device is programmed so that said processor may be directed to write to said read buffer.

15. The interface of claim 11, including an interrupt interval register for determining said interrupt time interval.

16. A system for communicating digitized voice data transmitted serially between a communications bus and a processor, all in a telecommunications system, comprising:
    a data interface for converting said digitized voice data from serial to parallel form and for generating part of an address used for receiving said digitized voice data from said communications bus;
    a circular buffer having a read buffer connected to said processor for receiving said digitized voice data from said communications bus, and a separate write buffer connected to said processor;
    an address generating means for generating an address to said read buffer or said write buffer for accessing said read buffer and said write buffer from said communications bus, at least one programmable logic device for controlling said write buffer and said read buffer and said at least one programmable logic device is programmed so that said processor is interrupted at a selected time interval to service said read buffer and said write buffer;
    a plurality of multiplexers for selecting an address to said read buffer and said write buffer, wherein said address is generated by said processor or generated by said data interface and said pointer generating means; and
    a control interface for handling switching of data from said communications bus.

17. The interface of claim 16, wherein said address generating means is a serial-to-parallel converter and a counter that counts incoming data samples.

18. The interface of claim 16, wherein said programmable logic device is programmed so that said processor may be directed to write to said read buffer.

19. The interface of claim 16, further including an interrupt interval register for determining said interrupt time interval.

* * * * *